(12) United States Patent
Krause

(10) Patent No.: US 8,693,214 B2
(45) Date of Patent: Apr. 8, 2014

(54) VOLTAGE CONVERTER

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 0 days.

(21) Appl. No.: 13/700,800

(22) PCT Filed: Jun. 28, 2011

(86) PCT No.: PCT/IB2011/052841
§ 371 (c)(1),
(2), (4) Date: Dec. 7, 2012

(87) PCT Pub. No.: WO2012/001627
PCT Pub. Date: Jan. 5, 2012

(65) Prior Publication Data
US 2013/0107581 A1    May 2, 2013

Related U.S. Application Data

(60) Provisional application No. 61/359,793, filed on Jun. 29, 2010.

(30) Foreign Application Priority Data

Jun. 29, 2010 (EP) ..................... 10167766

(51) Int. Cl.
*H02M 3/335* (2006.01)
(52) U.S. Cl.
USPC ...................................... 363/21.02
(58) Field of Classification Search
USPC ................ 363/15–18, 21.02, 21.03, 123, 363/125–127, 131, 132
See application file for complete search history.

(56) References Cited

U.S. PATENT DOCUMENTS

| 3,517,300 A | 6/1970 | McMurray |
| 4,017,784 A | 4/1977 | Simmons et al. |

(Continued)

FOREIGN PATENT DOCUMENTS

| CA | 1106915 B | 8/1981 |
| DE | 1638344 A1 | 9/1969 |

(Continued)

OTHER PUBLICATIONS

European Search Report dated Dec. 10, 2010 from EPO priority application EP10167766; with written opinion.

(Continued)

*Primary Examiner* — Adolf Berhane
(74) *Attorney, Agent, or Firm* — George Kapsalas; Patentbuero Paul Rosenich AG

(57) ABSTRACT

A voltage converter (1a . . . 1g), in particular a resonant converter for converting an input AC or DC voltage ($U_E$) into an output DC voltage ($U_A$). On the secondary side, a first secondary capacitor (CS1) is arranged between the secondary partial windings (WS1, WS2) of a transformer (TR1); furthermore, a first secondary full-bridge rectifier (GS1) provides the output direct voltage ($U_A$), the inputs of which are connected to a secondary partial winding (WS1, WS2) each of the transformer (TR1), resulting, at the input of the first secondary full-bridge rectifier (GS1), in a series connection including the secondary partial windings (WS1, WS2) and the first secondary capacitor (CS1). Finally, the voltage converter (1a . . . 1f) includes a second secondary full-bridge rectifier (GS2) connected in parallel with the first secondary full-bridge rectifier (GS1) for providing the output direct voltage ($U_A$), wherein the first secondary capacitor (CS1) is connected to the input of the second secondary full-bridge rectifier (GS2).

25 Claims, 14 Drawing Sheets

(56) References Cited

U.S. PATENT DOCUMENTS

| | | |
|---|---|---|
| 4,152,636 A | 5/1979 | Gorden |
| 4,336,486 A | 6/1982 | Gorden et al. |
| 4,591,775 A | 5/1986 | Nussel et al. |
| 4,685,039 A | 8/1987 | Inou et al. |
| 5,200,887 A | 4/1993 | Ioroi et al. |
| 5,555,494 A | 9/1996 | Morris |
| 5,633,577 A | 5/1997 | Matsumae et al. |
| 5,650,923 A | 7/1997 | Suzuki et al. |
| 5,710,698 A | 1/1998 | Lai et al. |
| 5,754,413 A | 5/1998 | Fraidlin et al. |
| 5,872,707 A | 2/1999 | Asplund |
| 5,949,662 A | 9/1999 | Bodin et al. |
| 5,973,939 A | 10/1999 | Tan |
| 6,169,683 B1 | 1/2001 | Farrington |
| 6,337,801 B2 | 1/2002 | Li et al. |
| 6,388,904 B2 | 5/2002 | Nomura |
| 6,490,183 B2 | 12/2002 | Zhang |
| 6,765,810 B2 | 7/2004 | Perry |
| 6,917,531 B2 * | 7/2005 | Scheel et al. ............... 363/97 |
| 7,149,096 B2 | 12/2006 | Batarseh et al. |
| 7,187,566 B2 | 3/2007 | Kawashima et al. |
| 7,498,776 B2 | 3/2009 | Nishimura |
| 7,593,244 B2 | 9/2009 | Sodo et al. |
| 7,679,941 B2 | 3/2010 | Raju et al. |
| 7,746,669 B2 | 6/2010 | Falk |
| 7,768,800 B2 * | 8/2010 | Mazumder et al. ......... 363/17 |
| 7,944,723 B2 | 5/2011 | Crane |
| 8,009,443 B2 | 8/2011 | Krause |
| 8,213,188 B2 * | 7/2012 | Tada et al. ................ 363/16 |
| 8,411,473 B2 * | 4/2013 | Cheng et al. ............... 363/37 |
| 2002/0126517 A1 | 9/2002 | Matsukawa et al. |
| 2003/0133317 A1 | 7/2003 | Norrga |
| 2005/0083716 A1 | 4/2005 | Marquardt |
| 2008/0190906 A1 | 8/2008 | Aigner |
| 2008/0316774 A1 | 12/2008 | Ito et al. |
| 2010/0008107 A1 | 1/2010 | Mallwitz et al. |
| 2010/0220501 A1 | 9/2010 | Krause |
| 2011/0261591 A1 | 10/2011 | Krause |
| 2012/0098331 A1 | 4/2012 | Krause |

FOREIGN PATENT DOCUMENTS

| | | |
|---|---|---|
| DE | 1763299 A1 | 10/1971 |
| DE | 2127497 A1 | 12/1972 |
| DE | 2624532 A1 | 12/1977 |
| DE | 2716445 A1 | 12/1977 |
| DE | 3305224 A1 | 8/1984 |
| DE | 4416679 A1 | 12/1994 |
| DE | 19646666 A1 | 6/1997 |
| DE | 19750041 C1 | 1/1999 |
| DE | 19941170 A1 | 3/2001 |
| DE | 10051156 A1 | 5/2002 |
| DE | 10151153 A1 | 4/2003 |
| DE | 102006055126 A1 | 6/2008 |
| EP | 0116925 A2 | 8/1984 |
| EP | 0670236 A1 | 9/1995 |
| EP | 1227571 A2 | 7/2002 |
| EP | 1391982 A2 | 8/2003 |
| EP | 0903830 B9 | 5/2005 |
| EP | 164326 A2 | 4/2006 |
| EP | 2144359 A2 | 1/2010 |
| JP | 2002-223565 A | 8/2002 |
| JP | 2003111413 A | 4/2003 |
| JP | 2005006455 A | 1/2005 |
| WO | 86/04749 A1 | 8/1986 |
| WO | 93/20614 A1 | 10/1993 |
| WO | 2007/060506 A2 | 5/2007 |

OTHER PUBLICATIONS

PCT International Search Report and Written Opinion from PCT/IB2011/052841 parent application of the present application; dated May 29, 2012.

Pinheiro, J.R. et al. "Isolated Interleaved-Phase-Shift PWM DC-DC ZVS Converters," from IEEE 2000 Industry Applications Conference, Oct. 8-12, 2000, Piscataway NJ, pp. 2383-2388; ISBN: 978-0-7803-6401-1.

Steigerwald, R.L. et al. "A Comparison of High Power DC-to-DC Soft-Switched Converter Topologies," from IEEE 1994 Annual Conference of the Industry Applications Society, Oct. 2-6, 1994, Denver,Colorado, pp. 1090-1096; ISBN:978-0-7803-1993-6.

"Resonant Converter Topologies," Application Note of STMicroelectronics Company, 1999.

Johnson, S.D. et al.; "A Comparison of Resonant Topologies in High Voltage DC Applications;" APEC '87 Conference Proceedings, 1987.

Vachaparambil, Z.K., "Basic Resonant Topologies for Switching Power Supplies," Purdue University ECE Technical Reports, Paper 181; Apr. 1, 1994.

* cited by examiner

VOLTAGE CONVERTER

This application is a 35 U.S.C. 371 national-phase entry of PCT International application No. PCT/IB2011/052841 filed on Jun. 28, 2011 and also claims benefit of priority to European application No. EP10167766 filed on Jun. 29, 2010, and also claims benefit of priority as a non-provisional of U.S. provisional application Ser. No. 61/359,793 filed on Jun. 29, 2010; parent application PCT/IB2011/052841, European application No. EP10167766 and U.S. provisional application Ser. No. 61/359,793 are all incorporated herein by reference in their respective entireties, as to all their parts, for all intents and purposes, as if identically set forth in full herein.

The invention relates to a voltage converter for converting an input alternating or direct voltage into an output direct voltage, which converter comprises at least one primary winding and at least two secondary partial windings as well as means for generating an alternating voltage in the primary winding from the input alternating voltage, wherein the alternating voltage in the primary winding has a higher frequency than the input alternating voltage.

Efficient voltage converters, which are used in an alternating current network and generate a direct voltage at the output, must meet a number of international standardised regulations, in order to ensure that they do not interfere with the operation of other devices or have a detrimental effect on the quality of the mains voltage. In particular for high outputs in the kilowatt range such as required, for example, for charging devices for electric vehicles, it is particularly important for the harmonic content in the mains input current to be small.

In the ideal case a voltage converter in the network behaves like a resistance, i.e. the current drawn by the network is at each moment in time proportional to the input voltage. If this is sinusoidal (which is usually the case), the drawn current also should be purely sinusoidal and not contain any further harmonics.

Many consumers, however, do not behave like an ohmic resistance, but contain inductive and capacitive components. If, for example, a capacitor is connected without further measures via a rectifier to an alternating voltage network, the current is drawn in short pulses and therefore contains many harmonics.

In order to prevent this, a power factor correction (PFC) circuit is frequently switched between rectifier and capacitor. In a simple case this is a boost converter which is controlled such that the current drawn by the network behaves like the mains voltage, i.e. is usually sinusoidal in shape.

Charging devices in electric vehicles, in particular, are subject to additional requirements: they should be small, light and robust but even so feed the energy drawn from the network to the battery substantially without any losses. For reasons of safety and electro-magnetic compatibility (EMC) provision should also be made for a potential separation between network and battery.

Due to these requirements one frequent aim is to omit the additional PFC stage. In addition the voltage converter shall be constructed as simply as possible and enable efficient energy conversion. Frequently these low weight and small construction size requirements can only be met by using a high clock frequency. This, however, means an increase in switching losses in the power semiconductors. In order to avoid this, a "resonant topology" is advantageously used, where a resonant circuit enables currentless or voltageless switching of the semiconductors, resulting in comparatively small switching losses.

Such a voltage converter is known, for example, from the DE 2716445, which discloses a DC/DC-resonant converter for converting an input direct voltage into an output direct voltage. Here a full-bridge inverter is connected to a primary partial winding each of a transformer. A capacitor is arranged between the primary partial windings, resulting in a series connection consisting of the primary partial windings and the capacitor at the output of the full-bridge inverter. In addition the connection comprises a full-bridge rectifier, wherein the input of the full-bridge rectifier is connected to the first capacitor and the output thereof is connected to the input of the full-bridge inverter. At a secondary side a centre point rectifier is arranged, which again produces an output direct voltage from the inverted voltage.

Furthermore, EP 2144359 A2 shows a resonant DC/DC-converter with a bridge at the input of the converter having at least two outputs. Additionally, the converter comprises a resonant circuit with a resonant inductivity and a resonant capacity. Moreover, the converter comprises a transformer, whose primary winding is connected to said bridge and whose secondary winding is connected to a rectifier. The converter also comprises a boost stage downstream of the resonant circuit. By means of an additional switching element the resonant circuit may be shorted thus storing energy in the resonant inductivity, which is released again when the switching element is opened.

The disadvantage with these and other circuits consists in that when operated in a rectified alternating network they produce current harmonics, since in their capacity as a buck converter they principally operate only if the input voltage translated by the transformer-to-winding-ratio is greater than the output voltage. Otherwise comparatively wide "current shortfalls" are produced in the area of the zero-crossing of the mains alternating voltage.

It is therefore within the scope of the invention to propose an improved voltage converter, in particular one which transfers power even for comparatively low input voltages and thus produces only a small harmonics content in the current.

According to the invention this requirement is met by a voltage converter of the kind mentioned in the beginning comprising additionally:

a first secondary full-bridge rectifier the inputs of which are connected to a first terminal each of a secondary partial winding each of the transformer and which, on the output side, is intended for providing the output direct voltage, a first secondary capacitor which is arranged between a second terminal each of the secondary partial windings, so that a series connection consisting of the secondary partial windings and the first secondary capacitor is connected to the input of the first secondary full-bridge rectifier, and a second secondary full-bridge rectifier connected in parallel to the first secondary full-bridge rectifier, wherein the input of the second secondary full-bridge rectifier has the first secondary capacitor and the second terminal of each secondary partial winding connected to it and wherein the output of same is connected in a homopolar manner with the output of the first secondary full-bridge rectifier.

Using the measures according to the invention it is possible for the secondary partial windings to act in series via the first secondary rectifier and the capacitor, or in parallel via the second secondary rectifier.

The current shortfalls around the zero-crossing of the input voltage are thus distinctly reduced, since the transformation ratio between input and output voltage is practically doubled due to the parallel switching of the secondary partial winding. For higher input voltages the parallel connection is additionally active so that there is neither a significant increase in losses nor a marked increase in the decay time of the pulses.

A special advantage is the fact that the switchover between series and parallel switching of the secondary partial coils is effected without additional means, i.e. without control signals being provided. For switchover is triggered by the voltage at the first secondary capacitor which, because of the alternating voltage on the secondary partial windings, is permanently recharged thereby causing a periodic switchover. In this context it should be noted that the term "switch", "switching" and "switchable" herein is used to denote physical switching by a circuit-interrupting switch as well as a current direction switchover/reversal. Accordingly "switch", "switching" and "switchable" has also to be read as "switchover" where applicable.

Thus, compared to circuitry known from the state of the art the duration of the current shortfall is practically halved, which distinctly reduces harmonics and is a significant step towards observing the "Power Factor Correction" requirement.

Advantageous designs and further developments of the invention are outlined in the present description when read in conjunction with the figures, and which in fact, are disclosed by the same.

It is advantageous if the transformer comprises two primary windings and the means for generating an alternating current in the primary windings are formed by:
  a first primary full-bridge rectifier or centre point rectifier for rectifying the input alternating voltage,
  an associated full-bridge inverter, the outputs of which are connected to a primary partial winding each of the transformer,
  a first primary capacitor, which is arranged between the primary partial windings, resulting in a series connection at the output of the full-bridge inverter, consisting of the primary partial windings and the first primary capacitor, and
  a second primary full-bridge rectifier connected in antiparallel to the full-bridge inverter, wherein the input of the second primary full-bridge rectifier has the first primary capacitor connected to it and wherein the output thereof is connected to the input of the full-bridge inverter.

In this way a resonance circuit is formed on the primary side, which circuit enables the transistors of the inverter to be switched over without power. Thus the circuit is highly energy efficient in operation and shows good EMV behaviour.

Further it is advantageous, if a first control transformer is provided for driving the full-bridge rectifier. The control signals for the transistors are symmetrical, since respectively diagonally arranged transistors are switched on and off respectively. By connecting the secondary-side coils of a control transformer to the control input of the transistors taking the polarity into consideration, it is possible for the inverter to be driven with relatively simple technical means.

It is especially advantageous, if the inputs of the first secondary full-bridge rectifier are connected via a series connection consisting of a second secondary capacitor and at least one switching element. With this variant of the invention the secondary partial windings are periodically short-circuited, so that the leakage inductance of the transformer acts as a boost converter choke. The second secondary capacitor may be considered as a "virtual load" which becomes effective when the secondary-side rectifier(s) stop being conductive because of an excessively high output voltage. In this way a current is still flowing even if the secondary-side rectifier(s) would really cause a current shortfall. Thus the PFC function is met in the best possible manner. Since the second secondary capacitor causes a further resonant circuit to be formed, the switching losses in the boost converter stage, moreover, can be avoided to a large extent, for the current through the switch can now decay to zero before it is opened.

It is also especially advantageous if the inputs of the first secondary full-bridge rectifier are connected via a series connection consisting of a second secondary capacitor and two transistors with an internal or external diode respectively connected in antiparallel, wherein the forward bias directions of the transistors are directed against each other. With this variant of the invention the switching element of the previously cited embodiment is formed by two transistors each having an internal or external diode switched in antiparallel. Switching can therefore be effected at a high frequency.

It is advantageous for the last two mentioned variants if a second control transformer is provided for driving the switching elements/the transistors, respectively. By connecting the secondary-side coils of a control transformer to the control inputs of the transistors taking the polarity into consideration, driving them can be effected with relatively simple technical means—as explained above for the inverter.

It is especially advantageous if the voltage converter according to the invention comprises a controller which is adapted to drive the switching element/the transistors at least at times into an ON-state, when the first and/or second secondary rectifier is inactive. As mentioned the leakage inductance of the transformer acts as a boost converter choke, when the secondary partial windings are short-circuited. Advantageously a controller monitors the occurrence of an operational state, in which the secondary-side rectifier or rectifiers stop conducting because of an excessively high output voltage. If the prerequisites for such a state exist (for example an excessively low input voltage), the switching element/the transistors are driven into an ON-state allowing a current to nevertheless pass through the secondary-side windings. Advantageously the switching element/the transistors are driven in time with the primary-side inverter. In order to detect the possible occurrence of the said operational state, the current flowing through the first and/or second secondary rectifier may be measured. It is also feasible, however, to measure the input and output voltage and to drive the switching element/the transistors into on ON-state when the input and output voltages reach critical values. The switching element or the transistors are driven into an ON-state then, where $U_E < U_A/ü$ is true for the switching variant without switchover between the series and the parallel connection of the secondary windings, or $U_E < U_A/ü$ is true for the switching variant with switchover between the series and parallel connection of the secondary windings. In this case $U_E$ is the input voltage, $U_A$ the output voltage and ü the transformation ratio of the transformer.

It is also especially advantageous if a centre tap of an autotransformer is connected to the output of the first primary rectifier and if its end taps can be optionally switched via a switching element to the series connection of the primary partial windings and the first primary capacitor or to the positive potential of the intermediate circuit. If the end taps of the autotransformer are switched to the series connection of the primary partial windings and the first primary capacitor, the input voltage transformed upwards through the autotransformer lies across the intermediate circuit. If, however, the end taps of the autotransformer are switched to the positive potential of the intermediate circuit, then only the input voltage lies across the intermediate circuit. In this way, even if the mains or input voltage is low, a high mains or input current can still flow. If there is no demand for increased power, the transformer winding is switched to the positive potential of the intermediate circuit. The two partial windings switched in parallel then act as an input-side filter choke. Advantageously this switching variant requires no further semiconductors, since the parallel diodes of the IGBTs (Insulated Gate Bipolar Transistors) normally used with an inverter or the body diode in MOSFETs (Metal Oxide Semiconductor Field Effect Transistors) take their place, which thus serve a double purpose.

The above-mentioned switchover of windings is not necessarily tied to the use of an autotransformer. It is also feasible to provide a potential-isolating transformer instead of an autotransformer. In this way potential isolation may be achieved also between the mains side or input side and the intermediate circuit.

In yet another preferable version of the invention an additional first primary capacitor is switchable connected in parallel with the first primary capacitor, an additional first secondary capacitor is switchable connected in parallel with the first secondary capacitor and an additional second secondary capacitor is switchable connected in parallel with the second secondary capacitor. This is another variant of the invention, which allows for a high mains or input current, even if the mains or input voltage is low, however, without the need of a comparable heavy and voluminous autotransformer.

It is advantageous if the transformer used is a leakage-field transformer. A loose coupling is thereby achieved between the primary and the secondary side. The leakage inductance of the leakage-field transformer is effective in series with its main inductance and thus substantially determines the resonant frequency of the resonant converter.

Finally it is favourable if the transformer used is a transformer with a rigid coupling, and additional external chokes are provided in series with its primary windings and/or additional external chokes are provided in series with its secondary windings. Instead of a leakage-field transformer a transformer with a rigid coupling may be used. Since its main inductance and leakage inductance are comparatively small, it is advantageous to provide separate chokes in series with the transformer's primary and/or secondary windings for fixing the resonant frequency of the resonant converter.

The above designs and further developments may be combined in a random manner. Readers of the present description, as well as the appended claims, and with reference to the appended drawings, shall understand that the terms "connected" and "connection" as used in relation to circuit elements, indicate electrical connections susceptible to current flow.

The present invention will now be explained in detail with reference to the versions indicated in the schematic figures of the drawing, in which FIG. 1 shows a prior art voltage converter;

Figure 10:
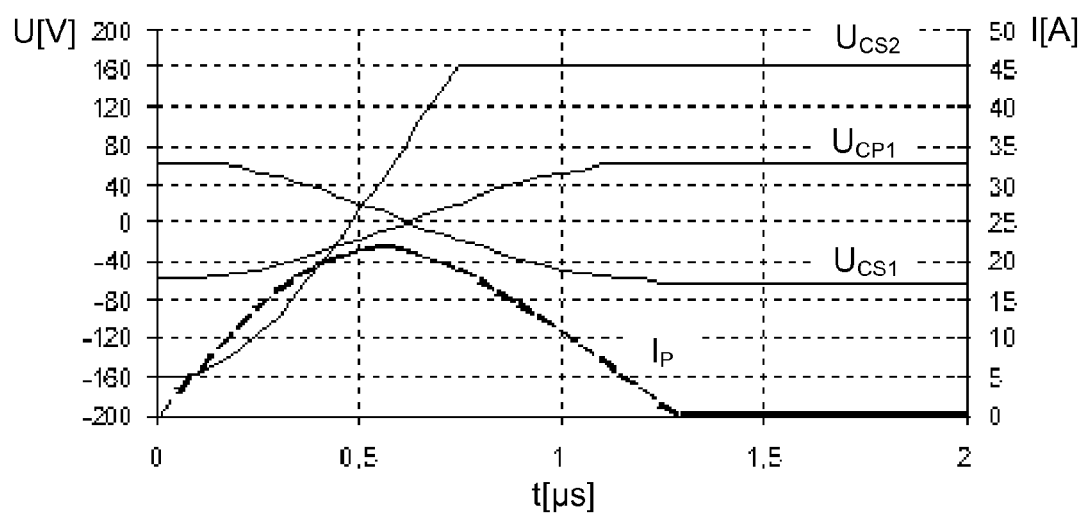
FIG. 10 shows the time progression of the voltages across the primary and secondary capacitors as well as primary current through the transformer of the voltage converter shown in FIG. 8 for a very small mains voltage with respect to the output voltage.
Figure 11:
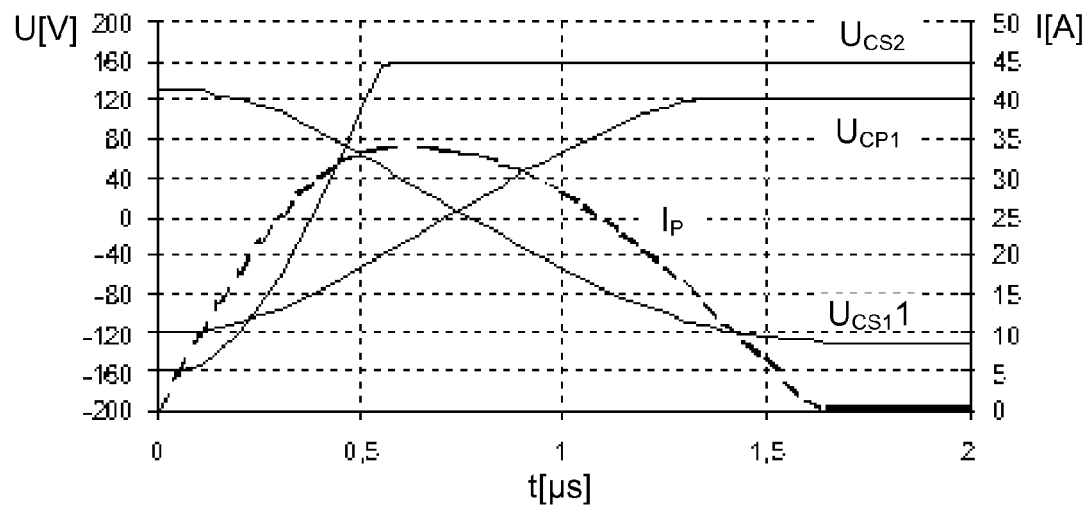
Figure 12:
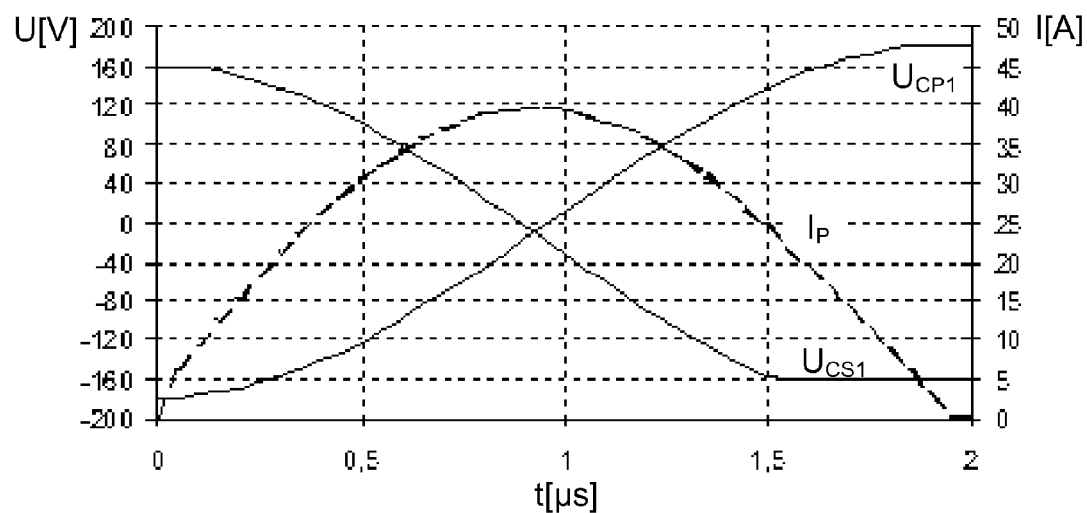
Figure 13:
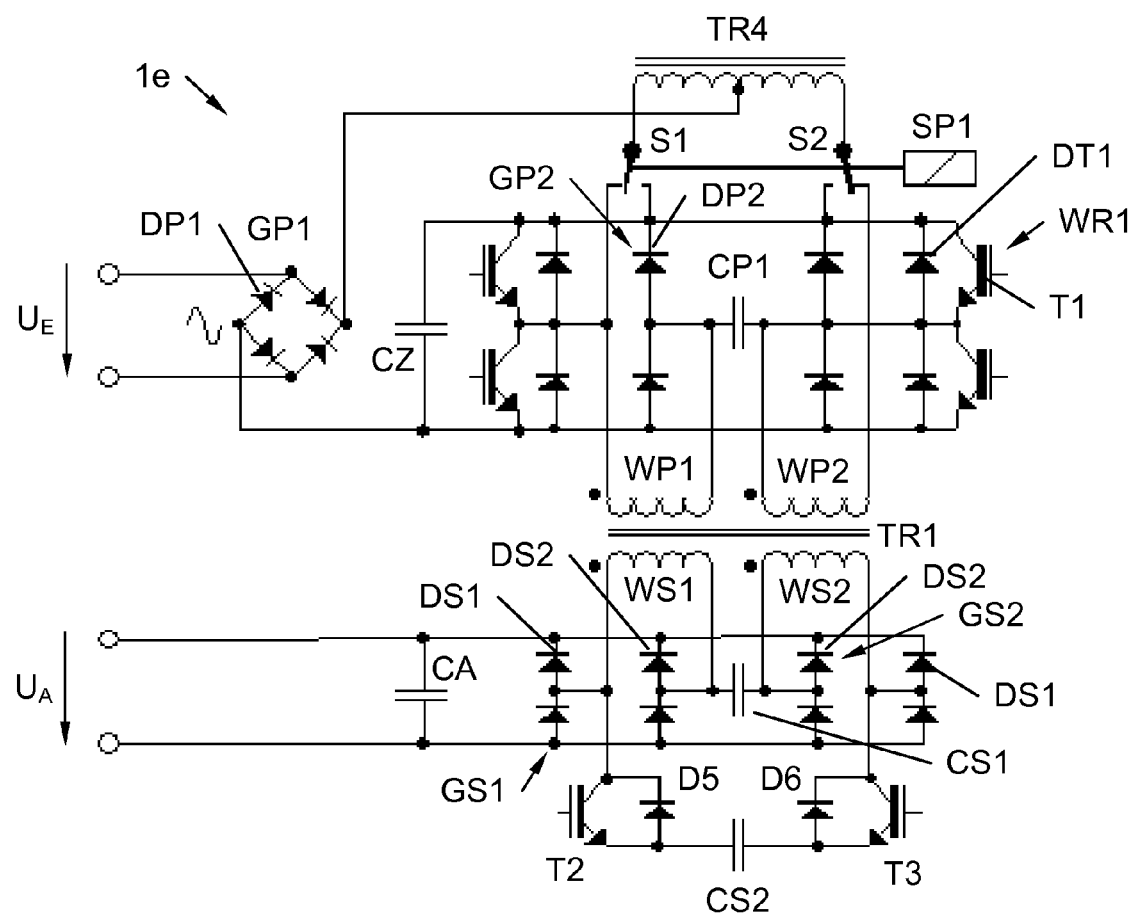

FIG. 11 as FIG. 10, but with a slightly higher mains voltage;

FIG. 12 as FIG. 10, but with a higher mains voltage with respect to the output voltage;

FIG. 13 shows a fourth variant of a voltage converter, and

Figure 4:
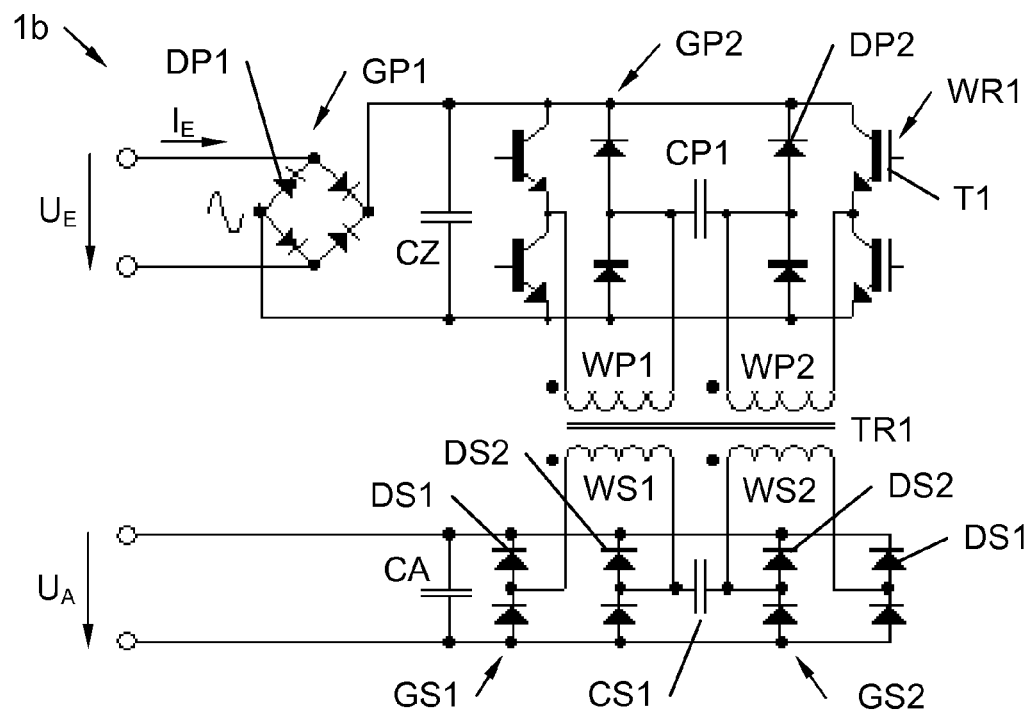
FIG. 4 shows a first variant of a voltage converter.
Figure 7:
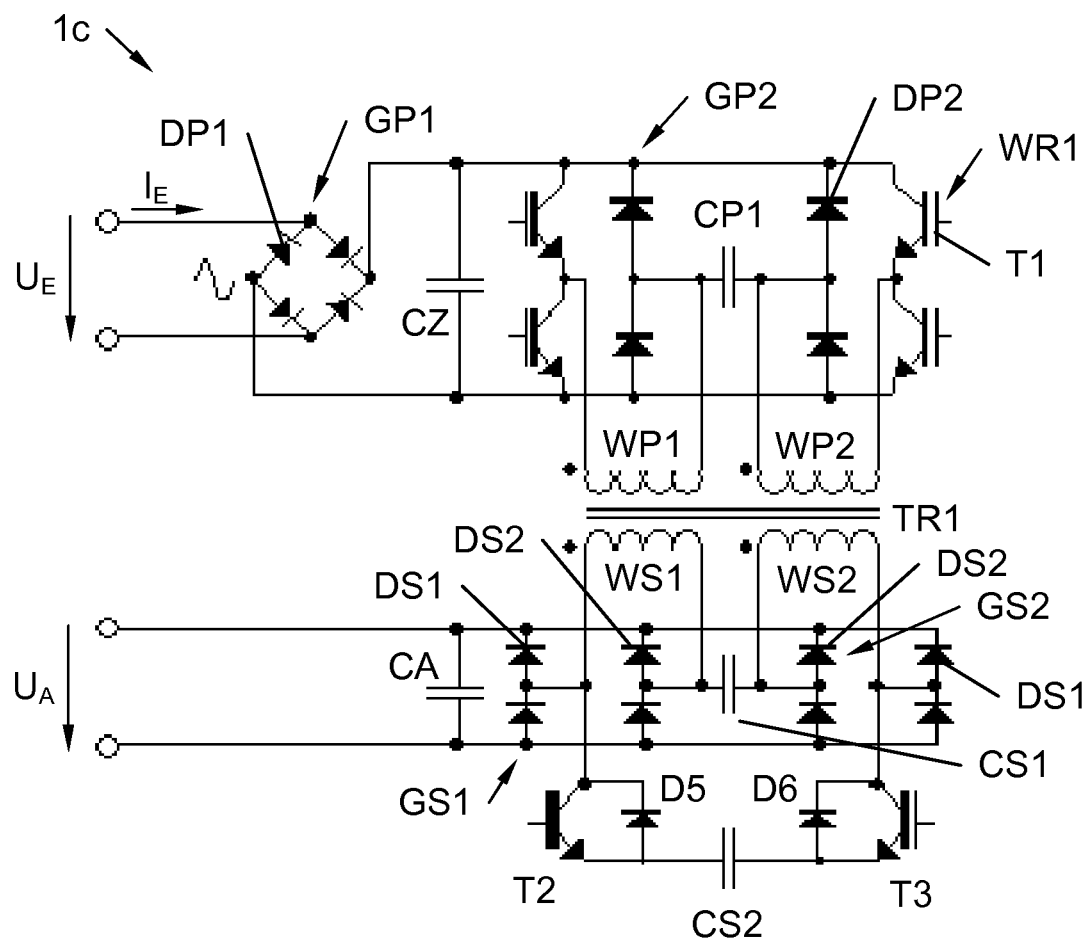
FIG. 7 shows a second variant of a voltage converter.
Figure 8:
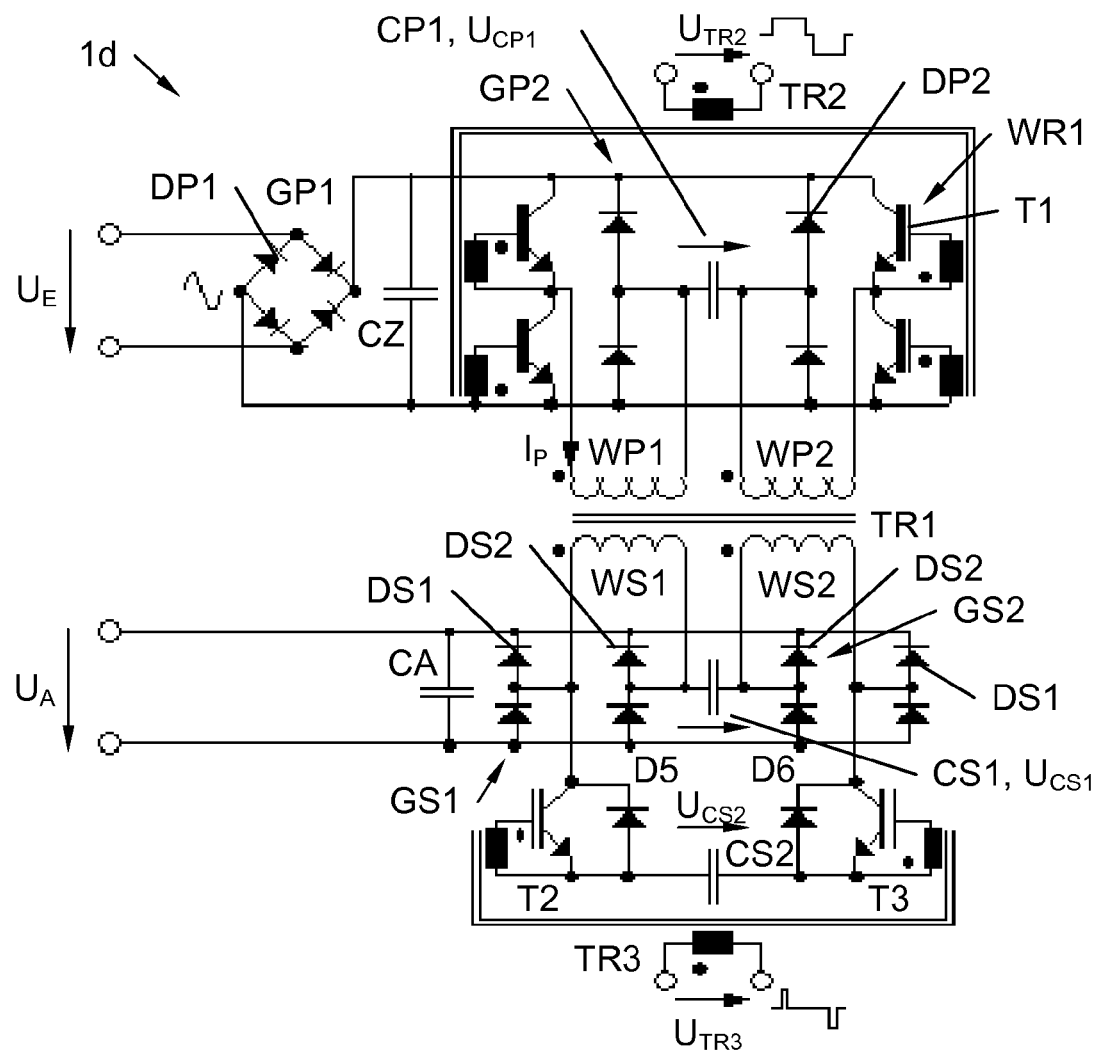
FIG. 8 shows a third variant of a voltage converter.
Figure 14:
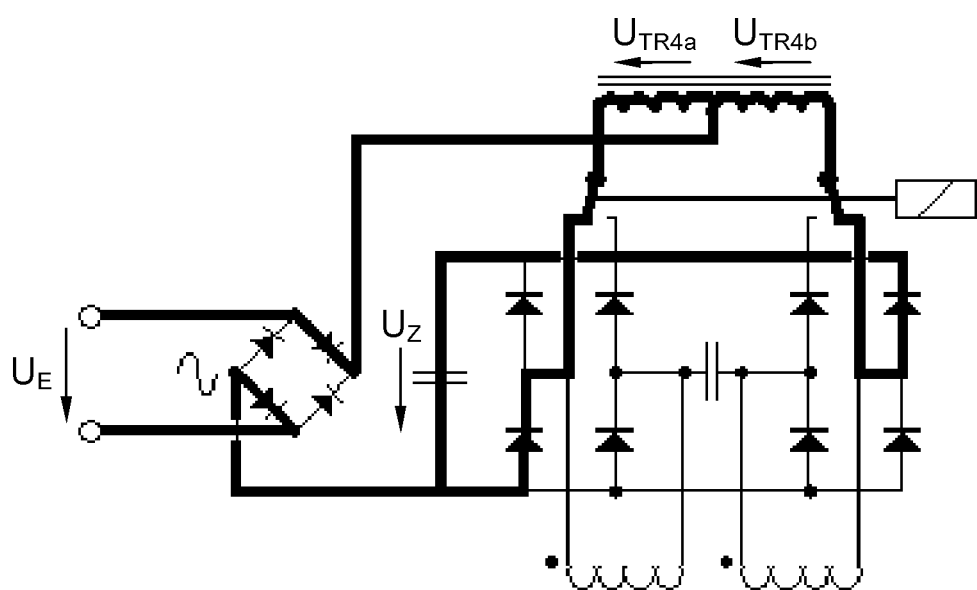
Figure 15:
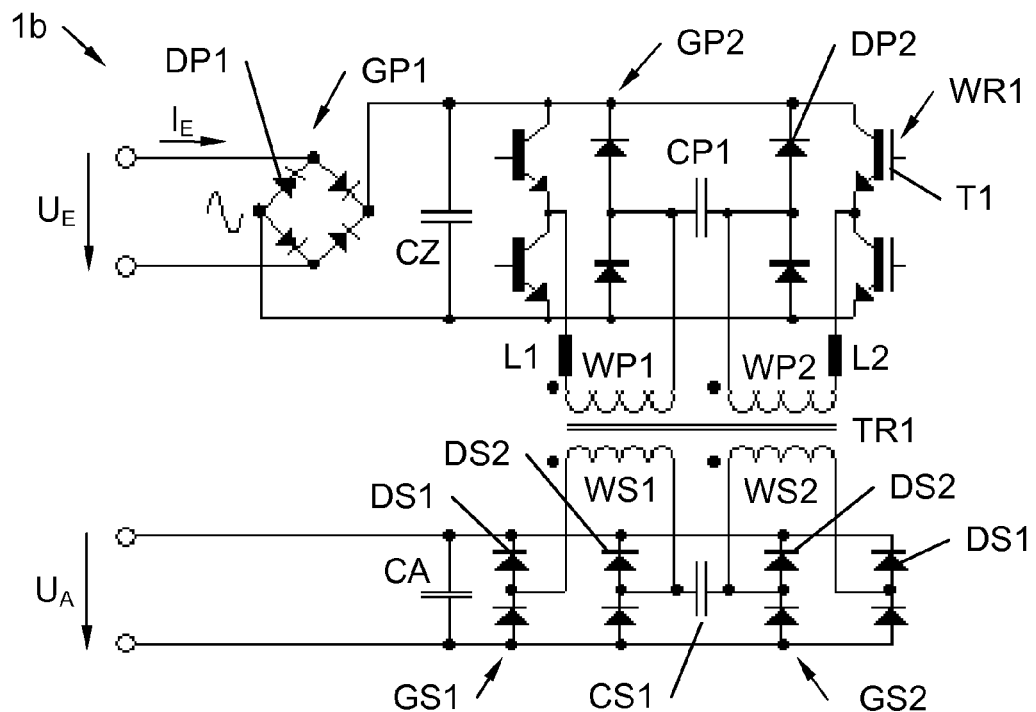
Figure 16:
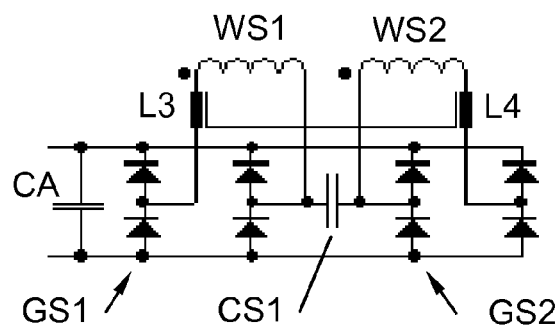
Figure 17:
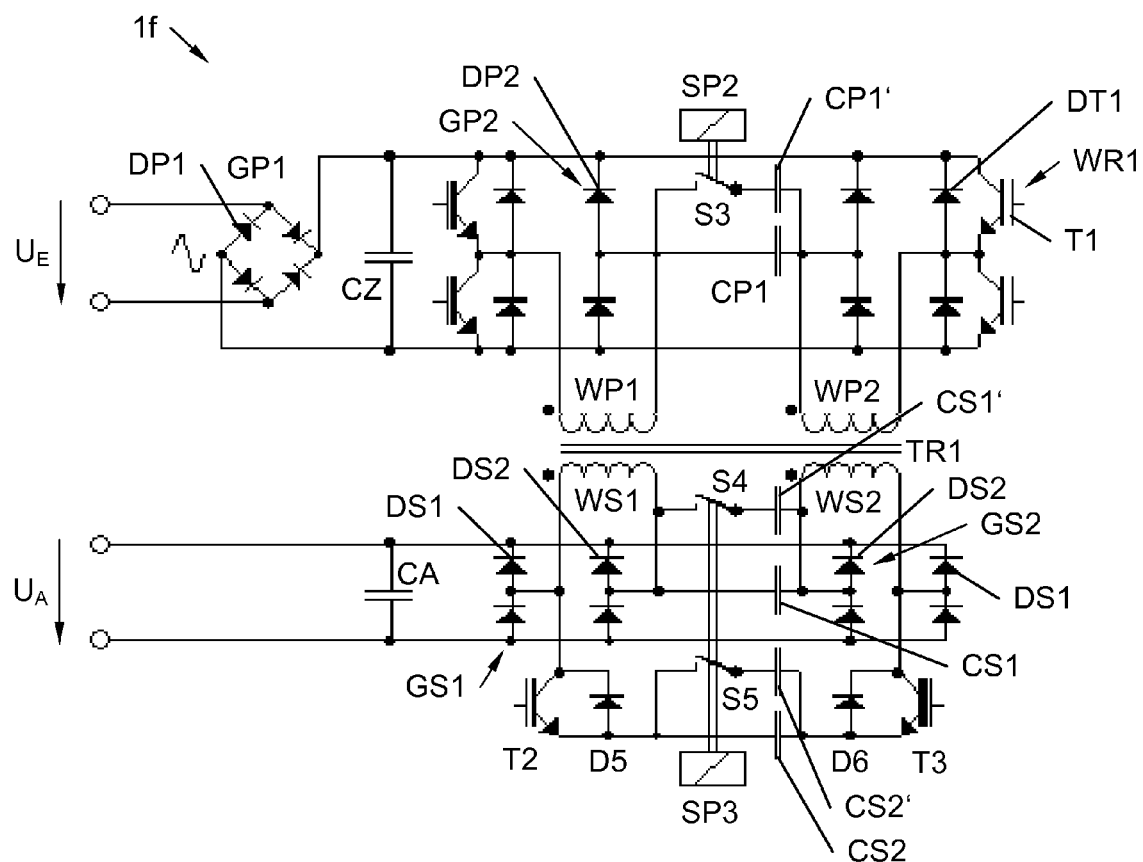
Figure 18:
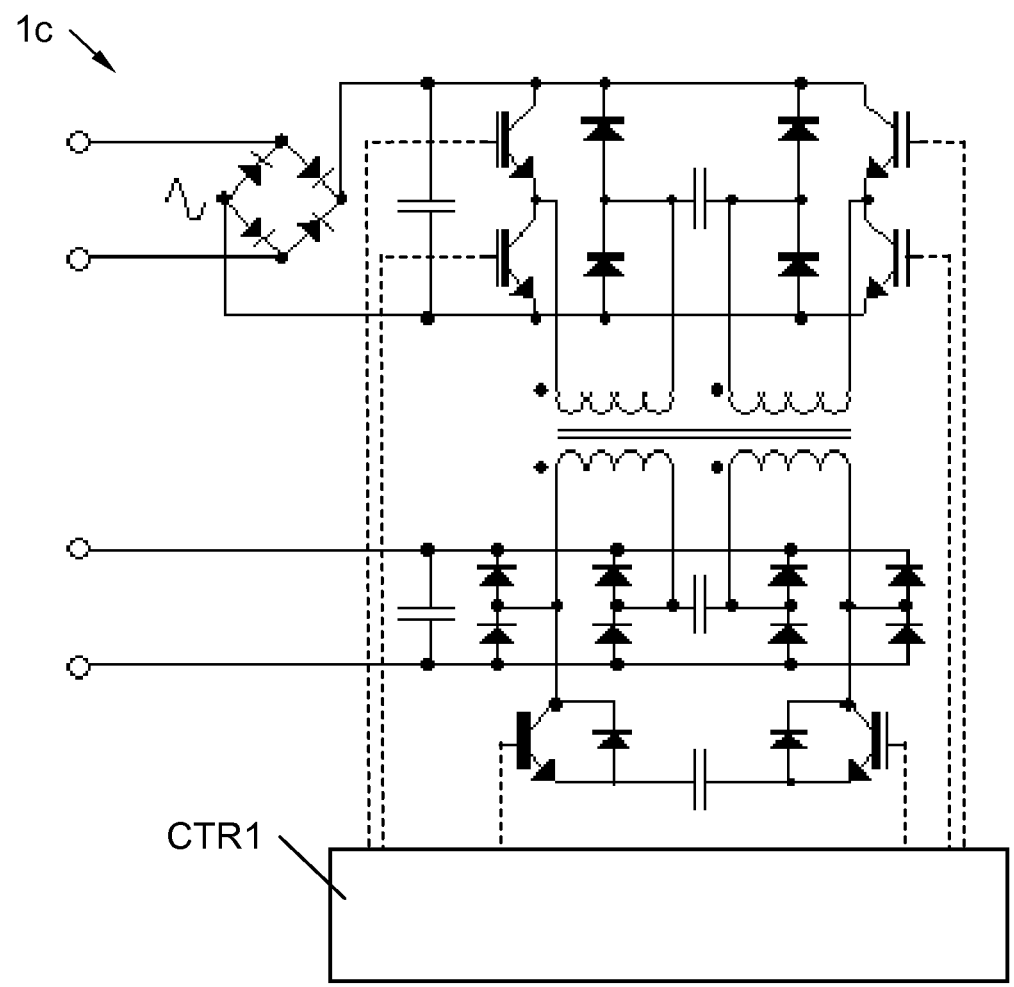
Figure 19:
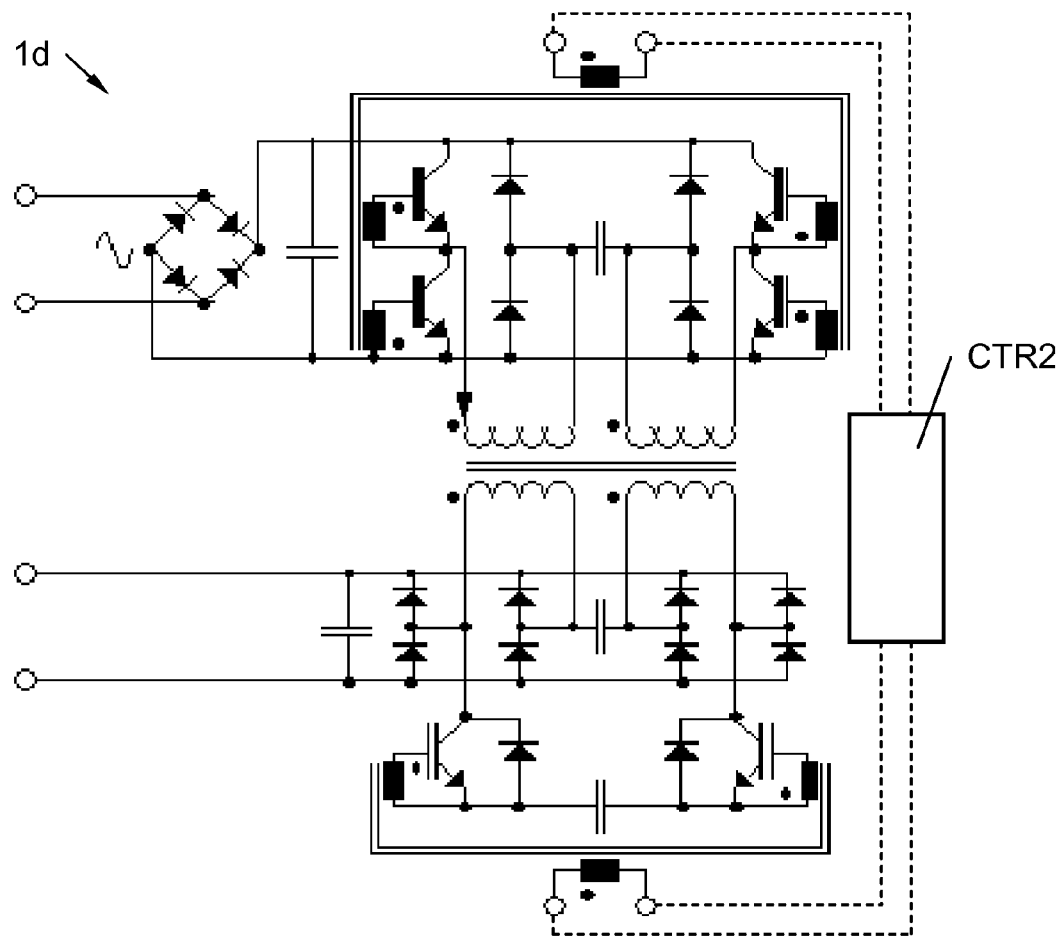
Figure 20:
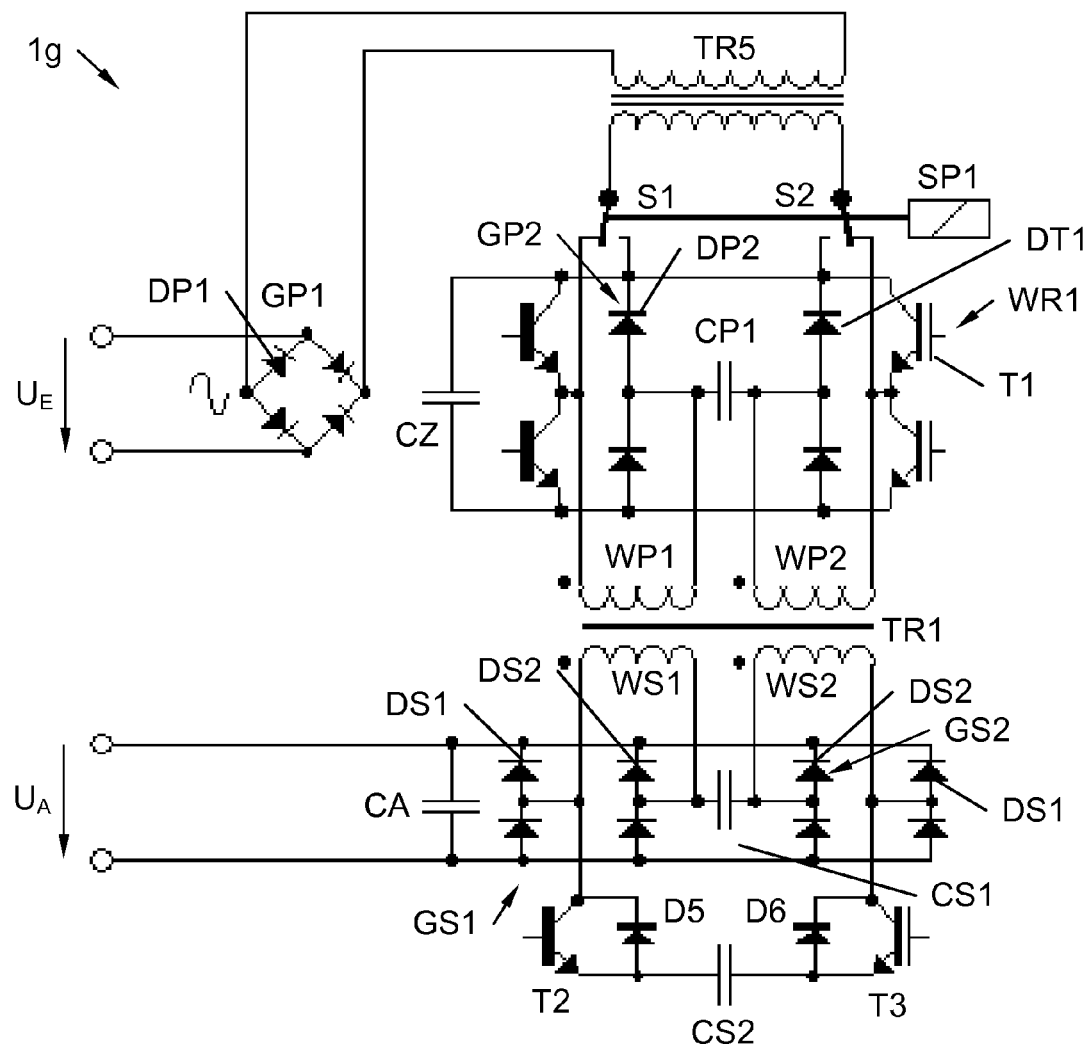

FIG. 14 shows a section of the voltage converter depicted in FIG. 13 with highlighted current path, FIG. 15 as FIG. 4, but with a transformer with a rigid coupling and separate chokes at the primary side of the voltage converter, FIG. 16 as FIG. 4, but with separate chokes at the secondary side of the voltage converter, FIG. 17 shows a version of the invention with additional switchable capacitors, FIG. 18 as FIG. 7 but with a control connected to the transistors, FIG. 19 as FIG. 8 but with a control connected to the control transformers; and, FIG. 20 as FIG. 13 but with a potential-isolating transformer instead of the autotransformer.

In the figures of the drawing identical and similar parts have been marked by the same reference symbols, and elements and features with similar functions—insofar as not otherwise stated—have been marked by the same reference symbols but different indices.

Figure 1:
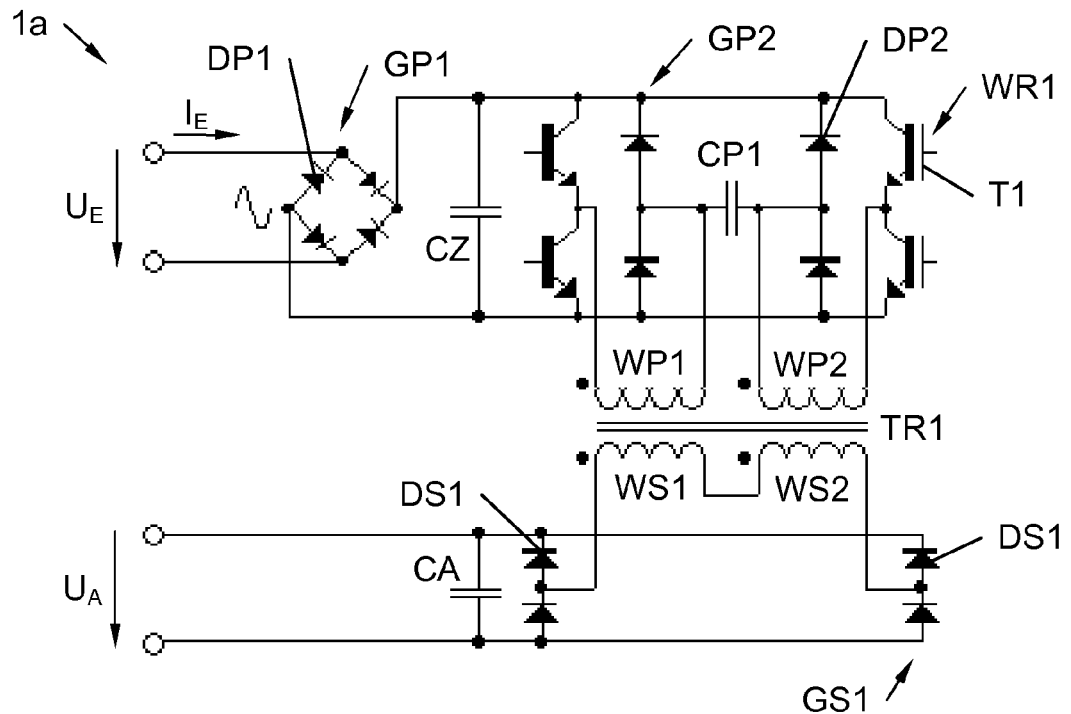

FIG. 1 shows a prior art voltage converter in the form of a resonant converter 1a for converting an input alternating voltage $U_E$ into an output direct voltage $U_A$, which converter is based on the resonant converter known from the DE 2716445.

The circuit shows a first primary full-bridge rectifier GP1 (but it could also be a centre point rectifier) for rectifying the input alternating voltage $U_E$, which rectifier feeds an intermediate circuit capacitor CZ. Connected to it is a full-bridge inverter WR1, the outputs of which are connected to a primary partial winding WP1, WP2 each of a transformer TR1. A first primary capacitor CP1 is arranged between the primary partial windings WP1, resulting in a series connection consisting of the primary partial windings WP1, WP2 and the first primary capacitor CP1 at the output of the full-bridge inverter WR1. Connected in antiparallel to the full-bridge inverter WR1 is a second primary full-bridge rectifier GP2, the input of which has the first primary capacitor CP1 connected to it and the output of which is connected to the input of the full-bridge inverter WR1. In addition the circuit shown in FIG. 1 comprises a first secondary full-bridge rectifier GS1, the inputs of which are connected to a secondary partial winding WS1, WS2 each of transformer TR1 and which, on the output side, is intended for providing the output direct voltage $U_A$. Finally, a filter capacitor CA is provided on the output side.

Figure 2:
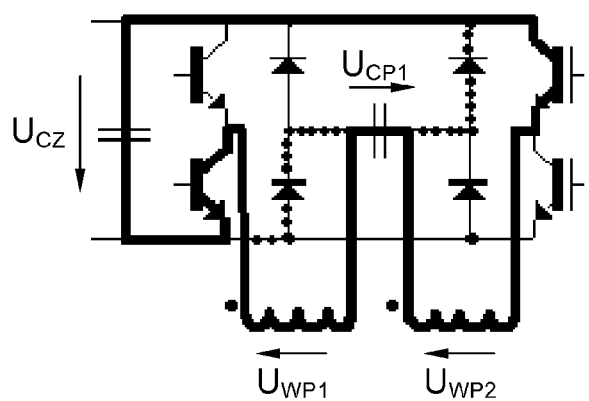
FIG. 2 shows a section of the voltage converter depicted in FIG. 1 with highlighted current path.

There now follows a detailed explanation of the function of the resonant converter 1a shown in FIG. 1 with reference to FIG. 2, which shows a section of the resonant converter 1a shown in FIG. 1 including current paths. This and the following explanations are always based on a steady state condition.

Say that at the beginning of a cycle the first primary capacitor CP1 is charged with the voltage $U_{CP1}=U_{CZ}$, and that the current is zero. The lower left one and upper right one of transistors T1 of the full-bridge inverter WR1 are then activated. Based on Kirchhoff's second law (mesh rule) the voltage at both primary windings WP1, WP2 is $U_{WP1}=U_{WP2}=U_{CZ}$, so that the current now beginning to flow recharges the first primary capacitor CP1. The corresponding current path is drawn in FIG. 2 as a thick line.

At the end of the recharging operation the voltage across the first primary capacitor CP1 is $U_{CZ}$ and its polarity is reversed. At this point in time, however, the current in the resonant circuit, as a rule, continues to flow across the current path shown as a dashed line through the bottom left and top right diodes DP2, until the energy stored in the leakage field of transformer TR1 has been passed to filter capacitor CA. This marks the end of half a cycle. By switching over from the lower left/upper right one to the lower right/upper left one of transistors T1 of the full-bridge inverter WR1 the previously described process is now run through under reversed current and voltage conditions. This then completes a full cycle, and a new cycle can begin. A pause of random duration may be inserted between the pulses.

Thus an alternating voltage with the amplitude $U_{CZ}$ and with a frequency determined by the resonant circuit/the switching frequency of transistors T1 forms at the first primary capacitor CP1. In this respect it should be noted that a leakage-field transformer is usually provided as transformer TR1, in order to achieve a loose coupling between the primary and secondary sides. The leakage inductance is effective in series with the illustrated main inductances WP1, WP2, WS1 and WS2 and thus to a large extent determines the resonant frequency or the duration of the above-described pulse.

The second primary rectifier GP2 is used for limiting the voltage of the first primary capacitor CP1. If due to an overshoot, $U_{CP1}$ in the polarity illustrated rises above the voltage $U_{CZ}$ of the intermediate circuit, the lower right one and upper left one of diodes DP2 of the second primary rectifier GP2 start conducting, thereby limiting the voltage $U_{CP1}$ for ideal diodes DP2 to $U_{CP1}=U_{CZ}$. For a reversed polarity of $U_{CP1}$, correspondingly, the lower left one and upper right one of diodes DP2 of the second primary rectifier GP2 start conducting, limiting the voltage $U_{CP1}$ also in reverse direction (see also the current path in FIG. 2 shown as a dotted line). This has the effect that the energy E stored in the first primary capacitor CP1 is always determined exactly by the height of the voltage UZ of the intermediate circuit and is transferred completely with each pulse to the output:

$$E = 2 \cdot CP1 \cdot U_{CZ}^2$$

This means that the pulse energy increases with the square of voltage $U_{CZ}$. If the cycle described above is repeated at the frequency f, the transferred power P results in $$P = 4 \cdot f \cdot CP1 \cdot U_{CZ}^2$$

Thus the converter at the input behaves like a resistance R, the value of which may be altered by the frequency f:

$$P = \frac{U_{CZ}^2}{R}$$

$$R = \frac{1}{4 \cdot f \cdot CP_1}$$

In particular, if the input voltage is sinusoidal, the input current is also sinusoidal.

Corresponding to the alternating voltage across the first primary capacitor CP1 an alternating current forms through the first primary capacitor CP1 and also through the two primary partial windings WP1, WP2, which current is transferred also to the secondary partial windings WS1, WS2 via the transformer TR1 at a transformation ratio ü (in the present example this is assumed to be ü=1 for simplicity's sake). The voltage across the secondary partial windings WS1, WS2 is now rectified by the first secondary full-bridge rectifier GS1, filtered through filter capacitor CA and is then made available as output voltage $U_A$.

The first secondary rectifier GS1, however, is conductive only if the voltage across the secondary partial windings WS1, WS2 is higher than the output voltage $U_A$. This is why current shortfalls form around the zero-crossing of output voltage $U_A$, and these increase as the output voltage $U_A$ increases in proportion to the input voltage $U_E$, wherein the transformation ratio ü of the first transformer T1 also has to be taken into consideration.

Figure 3:
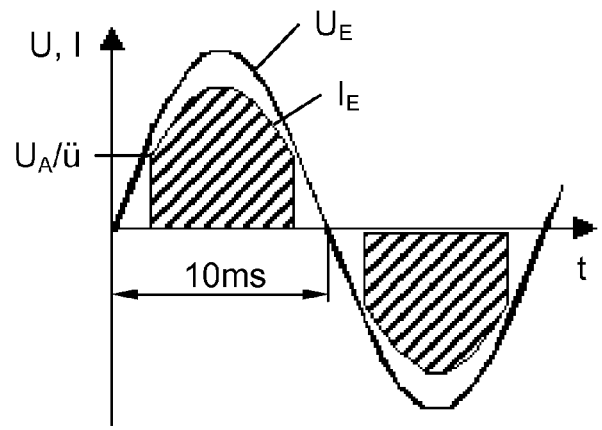
FIG. 3 shows the input voltage and the input current of voltage converter depicted in FIG. 1.

FIG. 3 shows the associated input voltage $U_E$ and the input current $I_E$ across time t, wherein a semi-wave lasts for a duration of 10 ms corresponding to a typical mains frequency of f=50 Hz. It may be seen that the current shortfall for $U_E<U_A/ü$ starts developing and that, as already mentioned, it increases with an increase in the output voltage $U_A$. But as the current shortfall increases, the harmonics content in the input current also grows and thus also the undesired backlash from the mains.

The illustrated current shortfalls—as will be readily recognised—become smaller, the larger the transformation ratio $$ü = n_2/n_1$$

of transformer TR1 is chosen. If a transformation ratio is chosen which is larger than $$ü_{max} \approx 2 \frac{U_A}{U_E(eff)}$$

the current pulses become, however, very big, which distinctly increases the power loss. Also the decay time of the current pulses is prolonged, which decreases the maximum frequency—and thus the maximum power.

In order to reduce these disadvantages, an advantageous variant of the invention depicted in FIG. 4 shows that a first secondary capacitor CS1 is arranged between the secondary partial windings WS1, WS2, resulting, at the input of the first secondary full-bridge rectifier GS1, in a series connection comprising the secondary partial windings WS1, WS2 and the first secondary capacitor CS1. Additionally the first secondary full-bridge rectifier GS1 is connected in parallel with a second secondary full-bridge rectifier GS2, to the input of which the first secondary capacitor CS1 is connected and the output of which is connected with the output of the first secondary full-bridge rectifier GS1. In an especially advantageous variant of the invention the following formula, moreover, applies to the relationship between the first primary capacitor CP1 and the first secondary capacity CS1:

$$C_{S1} = \frac{C_{P1}}{ü^2}$$

In practice, in order to compensate for the parasitic effects and capacities, the first secondary capacitor CS1 may in fact be chosen to be about 5-10% larger than specified in the above formula.

Figure 5:
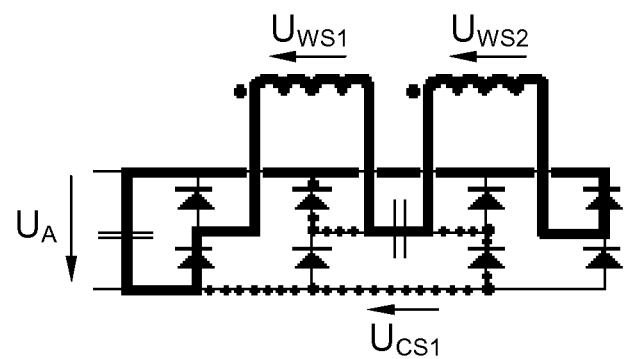
FIG. 5 shows a section of the voltage converter depicted in FIG. 4 with highlighted current path.

There now follows a detailed explanation of the function of the resonant converter 1b of FIG. 4 with reference to FIG. 5, which shows a section of the resonant converter 1b shown in FIG. 4 including current paths. Again the following explanations are based on a steady state condition.

On the primary side the circuit 1b remains unchanged to that shown in FIG. 1, which is why the explanations given there also apply to the circuit illustrated in FIG. 4. On the secondary side it is assumed that the first secondary capacitor CS1 is initially charged, as shown in FIG. 5. Voltages $U_{WS1}$ and $U_{WS2}$ lie across the secondary partial windings WS1, WS2. Therefore a current flow results across the lower left and upper right diode DS1 of the first secondary rectifier GS1 (see also the current path drawn as a thick line). The current causes the first secondary capacitor CS1 to be recharged. If the now reversed voltage $U_{CS1}$ rises above output voltage $U_A$, the upper left and lower right diodes DS2 of the second secondary rectifier GS2 become conductive. Thus a current path also forms along the dotted line. It can therefore be recognised that the two partial windings WS1, WS2 are no longer switched in series but now in parallel, wherein advantageously the switchover is effected without additional means, i.e. without control signals being provided.

After the voltages $U_{WS1}$ and $U_{WS2}$ have changed direction at the partial windings WS1, WS2, an almost analogue sequence takes place in the second half wave, but with negative voltages and current paths across diodes DS1 and DS2 which up to now have been inactive. Then the cycle starts again.

Figure 6:
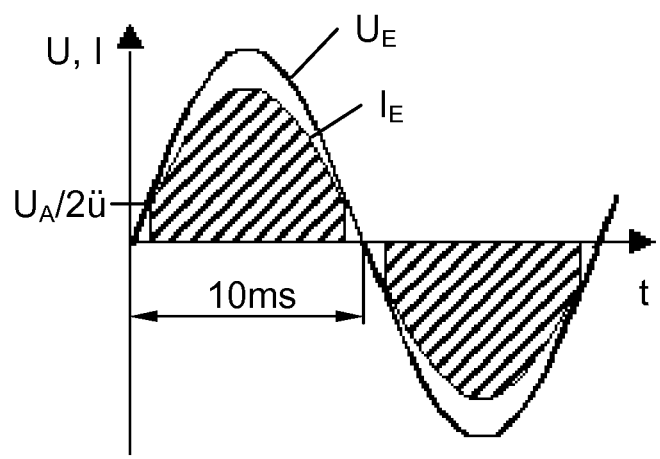
FIG. 6 shows the input voltage and the input current of voltage converter depicted in FIG. 4.

Although, as before, no power transfer occurs for $U_E < U_A/ü$, the transformation ratio may be practically doubled due to the mainly parallel effect of the secondary partial windings WS1, WS2, without a big increase in losses and without the decay time of the pulses becoming too long. Thus duration of the current shortfall is practically halved compared to the variant shown in FIG. 1, which distinctly reduces the harmonics. FIG. 6 shows a corresponding voltage and current progression, which clearly reveals that the current shortfall has been considerably reduced.

It is noted at this point that the diodes DS1 and DS2 in the rectifiers GS1 and GS2 are grouped in a purely arbitrary manner. It would quite feasible to regard the diodes DS1 and DS2 as four half bridges connected in parallel. Further it would be feasible to assign the four left-hand diodes to a full-bridge rectifier, and the four right-hand diodes to a further rectifier. But the function of the circuit remains unchanged.

Due to the smaller current shortfall the harmonic content in the mains current $I_E$ may be reduced, but it still exceeds the admissible limit value in many cases. In order to prevent this, the converter should also operate even for very small input voltages (down to practically zero). Therefore a boost converter function is introduced in a further development of the invention, which is depicted in FIG. 7.

Compared to the circuit shown in FIG. 4, with the circuit shown in FIG. 7 the inputs of the first secondary full-bridge rectifier GS1 are connected with each other via a series connection consisting of a second secondary capacitor CS2 and at least one switching element. Specifically, the inputs of the first secondary full-bridge rectifier GS1, in the version shown, are connected via a series connection consisting of a second secondary capacitor CS2 and two transistors T2, T3, each of which comprises an internal or external diode D5, D6 connected in antiparallel. The forward bias directions of transistors T2, T3 are directed against each other.

The function of this variant of the invention is as follows: With the variant shown the secondary partial windings WS1, WS2 are periodically short-circuited via transistors T2 and T3, causing the leakage inductance of transformer TR1 to act as a boost converter choke. The second secondary capacitor CS2 may also be regarded as a "virtual load" which becomes active when $$|U_E| < U_A/ü \text{ or } |U_E| < U_A/2ü$$

In this way a current continues to flow, even if a current shortfall were to exist in the two previously presented variants. The PFC function is thus optimally met.

Thus the circuit 1c on the input side behaves like a resistance R even for small voltages at the voltage source $U_E$:

$$P = \frac{U_E^2}{R}$$

with $$R = \frac{1}{4 \cdot f \cdot C_{P1}}$$

Using the second secondary capacitor CS2 the switching losses in the boost converter stage can be largely avoided due to the formation of a further resonant circuit, since the current through the semiconductor switches T2, T3 can decay down to zero before these are opened.

An advantageous value for the additional second secondary capacitor CS2 is:

$$C_{S2} = \frac{C_{S1}}{4} = \frac{C_{P1}}{4ü^2}$$

In practice the second secondary capacitor CS2 may be about 5-10% larger than specified by the above formula, in order to compensate for the parasitic effects and capacities.

FIG. 18 shows the voltage converter 1c of FIG. 7 with an additional controller CTR1, which controls the transistors T1 of the inverter WR and the transistors T2 and T3.

At this point it should be noted that it is possible to add the boost converter function also to the circuit 1a shown in FIG. 1. The second secondary rectifier GS2 and the first secondary capacitor CS1 may then be omitted. In this case the circuit is simpler, the current shortfall, however, which is to be bridged by the boost converter function, is larger.

FIG. 8 shows a variant of the invention, where the primary and secondary power switches T1 . . . T3 are driven directly by two additional control transformers TR2 and TR3. Since the control signals are symmetrical, only the secondary coils of the control transformers TR2 and TR3 need to be connected to the control inputs of transistors T1 . . . T3.

The transferred power is generally:

$$P = 4 \cdot f \cdot C_{P1} \cdot U_E^2$$

where f indicates the switching frequency of the respectively diagonally arranged transistors T1 of inverter WR1. The power of the converter is therefore directly proportional to the driving frequency. In order to prevent the control transformers TR2 and TR3 from becoming saturated at low frequencies, the pulse width can be correspondingly limited.

FIG. 19 shows the voltage converter 1d of FIG. 8 with an additional controller CTR2, which controls the transistors T1 of the inverter WR and the transistors T2 and T3 by means of the control transformers TR2 and TR3.

Figure 9:
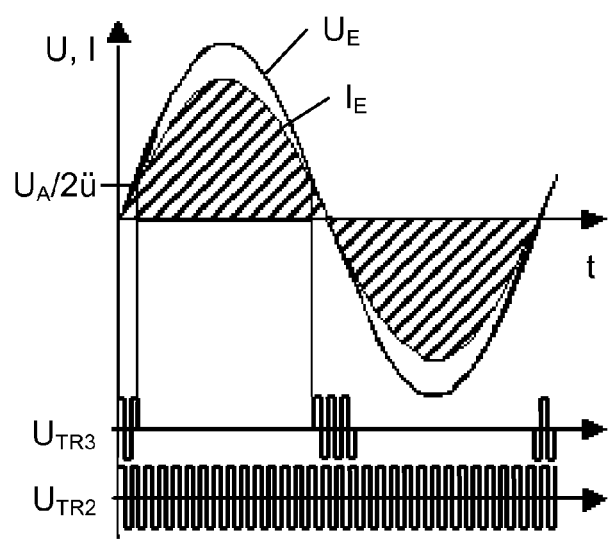
FIG. 9 shows the input voltage and the input current of voltage converter depicted in FIG. 8.

FIG. 9 shows, what the control signal progressions could look like. It is good to see that the switching frequency of inverter WR1 or the control transformers TR2 and TR3 is higher compared to the mains frequency (note: in order to be able to better illustrate the switching frequency it is drawn to a much smaller scale than it is in reality). Furthermore it can be clearly recognised that the control transformer TR3 and after that the transistors T2 and T3 are active only in the area of the zero crossing of the mains voltage $U_E$, i.e. if the following applies:

$$|U_E| < U_A/\ddot{u} \text{ or } |U_E| < U_A/2\ddot{u}$$

FIGS. 10 to 12 show typical progressions of the voltages $U_{CP1}$, $U_{CS1}$ and $U_{CS2}$ at the capacitors CP1, CS1 and CS2 as well as the primary current $I_P$ during a pulse of inverter WR1 for three different operating conditions:

In FIG. 10 the transient mains voltage $U_E$ is assumed to be small compared to the output voltage $U_A$. In the example shown 60V were chosen as an example for the transient value of the mains voltage $U_E$ and 160V for the output voltage $U_A$. As can be seen, the capacitors CP1 and CS1 are recharged at only 60V stroke each, wherein UCP1 is already limited by the second primary rectifier GP2, since UCP1 reaches 60V before the current has decayed to zero. The second secondary capacitor CS2 on the other hand is recharged from −160V to +160V. This shows that the boost converter function formed by the second secondary capacitor CS2 and the transistors T2 and T3 is active.

In FIG. 11 the transient mains voltage $U_E$ is still assumed to be small compared to the output voltage $U_A$, but already higher than in the case shown in FIG. 10. In the example shown 120V were chosen as being typical for the mains voltage $U_E$ and 160V were chosen for the output voltage $U_A$. As can be seen, here also the stroke at the first primary capacitor CP1 is limited by the second primary rectifier GP2, while the first secondary capacitor CS1 is now recharged at a bit more than 120V stroke. The second secondary capacitor CS2 is again recharged from −160V to +160V, but at a distinctly faster rate than in FIG. 10. The boost converter function formed by the second secondary capacitor CS2 and the transistors T2 and T3 is thus still active.

In FIG. 12 the transient mains voltage $U_E$ is now assumed to be higher than the output voltage $U_A$. In the example shown 180V were chosen as being typical for the mains voltage $U_E$ and 160V were chosen for the output voltage $U_A$. As can be seen, the stroke at the first secondary capacitor CS1 is limited by the second secondary rectifier GS2 to 160V, while the first primary capacitor CP1 is recharged at 180V stroke and is not limited until the very end of the pulse by the second primary rectifier GP2. The boost converter function formed by the second secondary capacitor CS2 and the transistors T2 and T3 is, in this case, already deactivated.

If, for example, the converter is dimensioned for 240V mains voltage, but shall also be operated at a lower mains voltage (for example at 120V as is customary in the US), the resulting power is distinctly lower due to the "resistance characteristic"; for half the mains voltage only a quarter of the power is transferred. This disadvantage could be eliminated if the low mains voltage could be doubled by simple means.

FIG. 13 shows a further variant of the converter 1e according to the invention, where a centre tap of an autotransformer TR4 is connected to the output of the first primary rectifier GP1 and the end taps thereof can be optionally switched, via a switching element S1, S2 (here driven via the coil SP1), to the series connection of the primary partial windings WP1, WP2 of the first primary capacitor CP1 or to the positive potential of the intermediate circuit.

The function of this additional transformer TR4 shall now be explained with reference to FIG. 14, in which the transistors T1 of the first inverter WR1 were omitted for better clarity and instead only the antiparallel body diodes DT1 are shown. These body or parallel diodes DT1 make it possible, for example with MOSFETs or IGBTs, which, as a rule, are used for such inverters, of allowing a current flow against the current direction envisaged for transistor T1. If such diodes DT1 are not inherently present, external, antiparallel diodes DT1 are to be provided for this variant of the circuit to function correctly.

Let's say the lower left one of the first transistors T1 is switched on, and a voltage $U_{TR4a} = U_E$ lies across the left-hand partial winding of autotransformer TR4. The transformation ratio of the autotransformer TR4 is preferably ü=1:2, resulting in a symmetrical voltage distribution and a voltage $U_{TR4b} = U_E$ lying across the right-hand partial winding. It is, of course, possible to choose another transformation ratio ü. The applied voltage causes the body diode DT1 of the upper right one of the first transistors T1 to become conductive with the result that double the input voltage $U_E$ lies across the intermediate circuit capacitor CZ (see also the thickly drawn current path). In this way the converter 1e is able to transfer its full power even for half the mains voltage $U_E$, allowing a correspondingly high mains current to flow. As shown in FIG. 14, no further semiconductors are necessary for this switching variant—provided body or parallel diodes DT1 are inherently present.

If there is no demand for increased power, the transformer winding is switched to the positive potential of the intermediate circuit. The two partial windings now switched in parallel act as an input-side filter choke.

Instead of the autotransformer TR4 a potential-isolating transformer TR5 of equal value may be provided, the primary side of which is connected to the output of the first primary rectifier GP1 and the secondary side of which can be optionally switched, via a switching element, to the series connection of the primary partial windings WP1, WP2 and the first primary capacitor CP1 or to the positive potential of the intermediate circuit (see the voltage converter 1g in FIG. 20, which is identical to the voltage converter 1e of FIG. 13 except of the potential-isolating transformer TR5).

FIG. 15 shows a variant of the voltage converter 1b already shown in FIG. 4. Instead of the previously used leakage-field-transformer TR1 and the associated inherently present leakage inductance not explicitly shown in FIG. 4, this version uses a transformer TR1 with a rigid coupling and therefore low leakage inductance. For this reason separate chokes L1 and L2 are provided in the version shown in FIG. 15 of the voltage converter 1b, in order to form a resonant circuit analogue to the resonant circuit shown in FIG. 2. In this respect FIG. 15 may also be regarded as a representational variant of the voltage converter 1b shown in FIG. 4, wherein each of the chokes L1 and L2 represents half the leakage inductance of the leakage-field-transformer TR1.

FIG. 16 shows the secondary side of the voltage converter 2b shown already in FIG. 4 with separate chokes L3 and L4. Their purpose can be derived, analogously to the chokes L1 and L2, from FIG. 15. Thus the chokes L3 and L4 may be provided for a transformer TR1 with a rigid coupling or they may represent the inherently present leakage inductance of a leakage-field-transformer TR1.

In this example the chokes L3 and L4 are shown as being coupled, which would also be possible for the chokes L1 and L2 in the example previously shown in FIG. 15. The coupling of the chokes L2 and L2/L3 and L4 ma, for example, be effected by winding them onto one core, which then permits an altogether small and simple construction.

FIG. 17 finally shows a version of the invention in the form of a converter 1f, which is able to transfer its full power even for half the mains voltage $U_E$ like the converter 1e of FIG. 13, however, without the need of an transformer TR4. Instead, the first primary capacitor CP1 is supplemented with an additional first primary capacitor CP1', which may be switched in parallel with the first primary capacitor CP1 by a third switch S3 being controlled by a second control coil SP2. In a similar way, the first secondary capacitor CS1 is supplemented with an additional first secondary capacitor CS1', which may be switched in parallel with the first secondary capacitor CS1 by a fourth switch S4 being controlled by a third control coil SP3. Finally, the second secondary capacitor CS2 is supplemented with an additional second secondary capacitor CS2', which may be switched in parallel with the second secondary capacitor CS2 by a fifth switch S5 also being controlled by the third control coil SP3.

If the switches S3 . . . S5 are closed, the resulting capacitances are doubled, so that because of $$P = I_E \cdot U_E \text{ and } P = 4 \cdot f \cdot C_{P1} \cdot U_E^2$$

the current through the transformer windings WP1 and WP2 stays the same even if the input voltage UE and thus the voltage UCP1 is halved. Note, that f does not denote the frequency of the oscillating circuit made of the intermediate circuit capacitor CZ, the first primary capacitor CP1 and the primary partial windings WP1, WP2 but denotes the switching frequency of the of the inverter WR1.

By reference to FIGS. 10, 11 and 12 it should also be noted that the length of a switching pulse decreases if the input voltage $U_E$ decreases, so that the elongation of the pulse caused by doubling the first primary capacitor CP1 is more or less compensated by the drop caused by the reduced input voltage $U_E$.

Both the voltage converter 1e of FIG. 13 and the voltage converter 1f of FIG. 17 allow using the same device for both the European and the US market with their different grid voltages. For this reason, it is very advantageous if the capacitances are doubled, however, any other values for the additional first primary capacitor CP1', the additional first secondary capacitor CS1' and the additional second secondary capacitor CS2', strictly speaking any other ratio between said additional capacitors CP1', CS1' as well as CS2' and their counterparts, are applicable as well if desired. Finally, it should be noted that the electromechanical switches S3 . . . S5 may also be replaced by solid state switches.

In conclusion it is noted, that the variants shown represent merely examples of the many possibilities for a voltage converter 1a . . . 1f according to the invention, and may not be utilised for limiting the scope of application of the invention. For example, instead of the IGBTs used in the examples, other transistor types—for example MOSFETs—may be used. In particular it is not mandatory to provide a resonant circuit on the primary side for the function according to the invention, although this has its advantages. In principle the alternating voltage in the transformer TR1 may be generated in any desired manner. The function of the secondary-side circuit part remains unaffected thereby. A person skilled in the art may adapt the invention to suit his needs without stepping outside the protected area of the invention. In addition it is pointed out that parts of the devices shown in the figures may also form the basis for independent inventions.

LIST OF REFERENCE LABELS

1a . . . 1g voltage converter
CA filter capacitor
CP1 first primary capacitor
CP1' additional first primary capacitor
CS1 first secondary capacitor
CS1' additional first secondary capacitor
CS2 second secondary capacitor
CS2' additional second secondary capacitor
CTR1, CTR2 controller
CZ intermediate circuit capacitor
D5, D6 diode
DP1 diode of GP1
DP2 diode of GP2
DS1 diode of GS1
DS2 diode of GS2
DT1 diode of WR1
GP1 first primary rectifier
GP2 second primary rectifier
GS1 first secondary rectifier
GS2 second secondary rectifier
I current
$I_E$ input current
$I_P$ primary current
L1 . . . L4 choke
S1 . . . S5 switch
SP1 . . . SP3 control coil
t time
T1 transistor of WR1
T2, T3 transistor
TR1 first transformer
TR2 first control transformer
TR3 second control transformer
TR4 autotransformer
TR5 potential-isolating transformer
U voltage
$U_A$ output voltage
$U_{CP1}$ voltage across CP1
$U_{CS1}$ voltage across CS1
$U_{CS2}$ voltage across CS2
$U_{CZ}$ voltage of intermediate circuit
$U_E$ input voltage
ü transformation ratio
$U_{TR2}$ voltage across TR2
$U_{TR3}$ voltage across TR3
$U_{TR4a}$ voltage across first partial coil of TR4
$U_{TR4b}$ voltage across second partial coil of TR4
$U_{WP1}$ voltage across WP1
$U_{WP2}$ voltage across WP2
$U_{WS1}$ voltage across WS1
$U_{WS2}$ voltage across WS2
WP1, WP2 primary partial windings of TR1
WR1 inverter
WS1, WS2 secondary partial windings of TR1

What is claimed is:
1. A voltage converter comprising:
a transformer, said transformer having at least one primary-side winding;
an AC/AC converting circuit connected to convert an input alternating current to a higher frequency input alternating current for said at least one primary-side winding;
said transformer having a first secondary-side partial winding, said first secondary-side partial winding having a respective first end, and said first secondary-side partial winding having a respective second end;
said transformer having a second secondary-side partial winding, said second secondary-side partial winding having a respective first end, and said first secondary-side partial winding having a respective second end;
a first secondary-side full bridge rectifier, said first secondary-side full bridge rectifier having a first input connected to said first end of said first secondary-side partial winding, said first secondary-side full bridge rectifier having a second input connected to said first end of said second secondary-side partial winding, said first sec- ondary-side full bridge rectifier having a respective output side configured to supply output direct voltage;

a first secondary-side capacitor, said capacitor having a first side connected to said second end of said first secondary-side partial winding, said capacitor having a second side connected to said second end of said second secondary-side partial winding;

a second secondary-side full bridge rectifier, said second secondary-side full bridge rectifier having a first input connected to said second end of said first secondary-side partial winding and connected to said first side of said first secondary-side capacitor, said second secondary-side full bridge rectifier having a second input connected to said second end of said second secondary-side partial winding and connected to said second side of said first secondary-side capacitor, said second secondary-side full bridge rectifier having a respective output side connected in a homopolar manner to said respective output side of said first secondary-side full bridge rectifier.

2. A voltage converter as claimed in claim 1 further comprising:
a second secondary-side capacitor, said second secondary-side capacitor having a respective first side connected to said first input of said first secondary-side full bridge rectifier, said second secondary-side capacitor having a respective second side connected to said second input of said first secondary-side full bridge rectifier; and,
a switch connected in series with said second secondary-side capacitor.

3. A voltage converter as claimed in claim 2 further comprising:
said switch is a first transistor; and,
a diode is connected in antiparallel to said transistor.

4. A voltage converter as claimed in claim 3 further comprising:
a second transistor connected in series at said second side of said second secondary-side capacitor, and a second diode connected in antiparallel to said second transistor; and,
said series connection of said first transistor, said second secondary-side capacitor, and said second transistor disposes the respective forward-bias directions of said first and second transistors, respectively, against each other.

5. A voltage converter as claimed in claim 4 further comprising:
a controller configured to control said first and second transistors in response to an inactive state in at least one of said first and second secondary-ide full bridge rectifiers.

6. A voltage converter as claimed in claim 4 further comprising:
a control transformer connected to controllably drive said first and second transistors.

7. A voltage converter as claimed in claim 6 further comprising:
said control transformer has secondary-side coils, said control transformer secondary-side coils being connected to control inputs of said first and second transistors.

8. A voltage converter as claimed in claim 1 further comprising:
at least one choke connected in series with one of said first or second secondary-side partial windings.

9. A voltage converter as claimed in claim 1 further comprising:
a first supplemental secondary-side capacitor switchably connected in parallel to said first secondary-side capacitor, between said second ends, respectively, of said first and second secondary-side partial windings.

10. A voltage converter as claimed in claim 9 further comprising:
a second secondary-side capacitor, said second secondary-side capacitor having a respective first side connected to said first input of said first secondary-side full bridge rectifier, said second secondary-side capacitor having a respective second side connected to said second input of said first secondary-side full bridge rectifier;
a switch connected in series with said second secondary-side capacitor; and,
a second supplemental secondary-side capacitor switchably connected in parallel to said second secondary-side capacitor, between said first and second inputs, respectively, of said first secondary-side full bridge rectifier.

11. A voltage converter as claimed in claim 10 further comprising:
said switch is a first transistor connected to said first side of said second secondary-side capacitor;
a second transistor connected in series at said second side of said second secondary-side capacitor; and,
said series connection of said first transistor, said second secondary-side capacitor with said parallel second supplemental secondary-side capacitor, and said second transistor, disposes the respective forward-bias directions of said first and second transistors, respectively, against each other.

12. A voltage converter comprising:
a transformer, said transformer having a primary side and said transformer having a secondary side;
a first primary-side rectifier for rectifying input alternating current;
a primary-side full bridge inverter, said primary-side full bridge inverter having an input supplied via rectified current from said first primary-side rectifier, said primary-side full bridge inverter having a first output, and said primary-side full bridge inverter having a second output;
said transformer primary side having a first primary-side partial winding, said first primary-side partial winding having a respective first end, and said first primary-side partial winding having a respective second end;
said transformer primary side having a second primary-side partial winding, said second primary-side partial winding having a respective first end, and said second primary-side partial winding having a respective second end;
said first output of said primary-side full bridge inverter being connected to said first end of said first primary-side partial winding, and said second output of said primary-side full bridge inverter being connected to said first end of said second primary-side partial winding;
a second primary-side rectifier, said second primary-side rectifier having an output connected to said primary-side full bridge inverter's input, said second primary-side rectifier having a first input connected to said second end of said first primary-side partial winding, said second primary-side rectifier having a second input connected to said second end of said second primary-side partial winding;
a first primary-side capacitor, said first primary-side capacitor having a first side connected to said second end of said first primary-side partial winding and to said first input of said second primary-side rectifier, said first primary-side capacitor having a second side connected to said second end of said second primary-side partial winding and to said second input of said second primary-side rectifier;

said transformer having a first secondary-side partial winding, said first secondary-side partial winding having a respective first end, and said first secondary-side partial winding having a respective second end;

said transformer having a second secondary-side partial winding, said second secondary-side partial winding having a respective first end, and said first secondary-side partial winding having a respective second end;

a first secondary-side full bridge rectifier, said first secondary-side full bridge rectifier having a first input connected to said first end of said first secondary-side partial winding, said first secondary-side full bridge rectifier having a second input connected to said first end of said second secondary-side partial winding, said first secondary-side full bridge rectifier having a respective output side configured to supply output direct voltage;

a first secondary-side capacitor, said first secondary-side capacitor having a first side connected to said second end of said first secondary-side partial winding, said first secondary-side capacitor having a second side connected to said second end of said second secondary-side partial winding;

a second secondary-side full bridge rectifier, said second secondary-side full bridge rectifier having a first input connected to said second end of said first secondary-side partial winding and connected to said first side of said first secondary-side capacitor, said second secondary-side full bridge rectifier having a second input connected to said second end of said second secondary-side partial winding and connected to said second side of said first secondary-side capacitor, said second secondary-side full bridge rectifier having a respective output side connected in a homopolar manner to said respective output side of said first secondary-side full bridge rectifier.

13. A voltage converter as claimed in claim 12 further comprising:
a first control transformer connected to controllably drive said primary-side full bridge inverter.

14. A voltage converter as claimed in claim 13 further comprising:
a second secondary side capacitor, said second secondary-side capacitor having a respective first side connected to said first input of said first secondary-side full bridge rectifier, said second secondary-side capacitor having a respective second side connected to said second input of said first secondary-side full bridge rectifier;
a switch connected in series with said second secondary-side capacitor, said switch including a first transistor connected to said first side of said second secondary-side capacitor;
a second transistor connected in series at said second side of said second secondary-side capacitor; and,
a second control transformer connected to controllably drive said first and second transistors.

15. A voltage converter as claimed in claim 14 further comprising:
an autotransformer, said autotransformer having a center tap, said center tap being connected to an output of said first primary-side rectifier;
said autotransformer having a first end tap, and said autotransformer having a second end tap; and,
at least one autotransformer control switch configured to controllably connect said first and second end taps, respectively, to said respective first ends of said first and second primary-side partial windings.

16. A voltage converter as claimed in claim 14 further comprising:
a potential-isolating transformer, said potential-isolating transformer having a respective primary side, said potential-isolating transformer prig primary side being connected to an output of said first primary-side rectifier;
said potential-isolating transformer having a respective secondary side; and,
at least one potential-isolating transformer control switch configured to controllably connect said secondary side of said potential-isolating transformer to said respective first ends of said first and second primary-side partial windings.

17. A voltage converter as claimed in claim 12 further comprising:
an autotransformer, said autotransformer having a center tap, said center tap being connected to an output of said first primary-side rectifier;
said autotransformer having a first end tap, and said autotransformer having a second end tap; and,
at least one autotransformer control switch configured to controllably connect said first and second end taps, respectively, to said respective first ends of said first and second primary-side partial windings.

18. A voltage converter as claimed in claim 12 further comprising:
a potential-isolating transformer, said potential-isolating transformer having a respective primary side, said potential-isolating transformer primary side being connected to an output of said first primary-side rectifier;
said potential-isolating transformer having a respective secondary side; and,
at least one potential-isolating transformer control switch configured to controllably connect said secondary side of said potential-isolating transformer to said respective first ends of said first and second primary-side partial windings.

19. A voltage converter as claimed in claim 12 further comprising:
at least one choke connected in series with one of said first or second primary-side partial windings.

20. A voltage converter as claimed in claim 19 further comprising:
at least one additional choke connected in series with one of said first or second secondary-side partial windings; and,
said transformer has a rigid coupling.

21. A voltage converter as claimed in claim 12 further comprising:
said transformer is a leakage-field transformer.

22. A voltage converter as claimed in claim 12 further comprising:
a first supplemental primary-side capacitor switchably connected in parallel to said first primary-side capacitor, between said second ends, respectively, of said first and second primary-side partial windings.

23. A voltage converter as claimed in claim 22 further comprising:
a first supplemental secondary-side capacitor switchably connected in parallel to said first secondary-side capacitor, between said second ends, respectively, of said first and second secondary-side partial windings.

24. A voltage converter as claimed in claim 23 further comprising:
- a second secondary-side capacitor, said second secondary-side capacitor having a respective first side connected to said first input of said first secondary-side full bridge rectifier, said second secondary-side capacitor having a respective second side connected to said second input of said first secondary-side full bridge rectifier;
- a switch connected in series with said second secondary-side capacitor; and,
- a second supplemental secondary-side capacitor switchably connected in parallel to said second secondary-side capacitor, between said first and second inputs, respectively, of said first secondary-side full bridge rectifier.

25. A voltage converter comprising:
- a transformer, said transformer having a primary side and said transformer having a secondary side;
- a first primary-side rectifier for rectifying input alternating current;
- a primary-side full bridge inverter, said primary-side full bridge inverter having an input supplied via rectified current from said first primary-side rectifier, said primary-side full bridge inverter having a first output, and said primary-side full bridge inverter having a second output;
- said transformer primary side having a first primary-side partial winding, said first primary-side partial winding having a respective first end, and said first primary-side partial winding having a respective second end;
- said transformer primary side having a second primary-side partial winding, said second primary-side partial winding having a respective first end, and said second primary-side partial winding having a respective second end;
- said first output of said primary-side full bridge inverter being connected to said first end of said first primary-side partial winding, and said second output of said primary-side full bridge inverter being connected to said first end of said second primary-side partial winding;
- a second primary-side rectifier, said second primary-side rectifier having an output connected to said primary-side full bridge inverter's input, said second primary-side rectifier having a first input connected to said second end of said first primary-side partial winding, said second primary-side rectifier having a second input connected to said second end of said second primary-side partial winding;
- a first primary-side capacitor, said first primary-side capacitor having a first side connected to said second end of said first primary-side partial winding and to said first input of said second primary-side rectifier, said first primary-side capacitor having a second side connected to said second end of said second primary-side partial winding and to said second input of said second primary-side rectifier;
- said transformer having a first secondary-side partial winding, said first secondary-side partial winding having a respective first end, and said first secondary-side partial winding having a respective second end;
- said transformer having a second secondary-side partial winding, said second secondary-side partial winding having a respective first end, and said first secondary-side partial winding having a respective second end;
- a first secondary-side full bridge rectifier, said first secondary-side full bridge rectifier having a first input connected to said first end of said first secondary-side partial winding, said first secondary-side full bridge rectifier having a second input connected to said first end of said second secondary-side partial winding, said first secondary-side full bridge rectifier having a respective output side configured to supply output direct voltage;
- a secondary-side capacitor, said secondary-side capacitor having a respective first side connected to said first input of said first secondary-side full bridge rectifier, said secondary-side capacitor having a respective second side connected to said second input of said first secondary-side full bridge rectifier;
- a switch connected in series with said second secondary-side capacitor, said switch having a first transistor;
- a diode connected in antiparallel to said transistor;
- a second transistor connected in series at said second side of said secondary-side capacitor, and a second diode connected in antiparallel to said second transistor; and,
- said series connection of said first transistor, said secondary-side capacitor, and said second transistor disposes the respective forward-bias directions of said first and second transistors, respectively, against each other.

* * * * *